(12) United States Patent
Golland et al.

(10) Patent No.: US 11,188,545 B2
(45) Date of Patent: *Nov. 30, 2021

(54) AUTOMATED MEASUREMENT OF CONTENT QUALITY

(71) Applicant: Microsoft Technology Licensing, LLC, Redmond, WA (US)

(72) Inventors: David Golland, Oakland, CA (US); Eric Huang, San Francisco, CA (US); Patrick Chase, Portola Valley, CA (US); Alexandre Patry, Dublin, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/448,308

(22) Filed: Jun. 21, 2019

(65) Prior Publication Data

US 2019/0310989 A1 Oct. 10, 2019

Related U.S. Application Data

(63) Continuation of application No. 15/481,080, filed on Apr. 6, 2017, now Pat. No. 10,380,129.

(51) Int. Cl.
| | |
|---|---|
| G06F 17/00 | (2019.01) |
| G06F 16/2457 | (2019.01) |
| H04L 29/08 | (2006.01) |
| G06F 16/901 | (2019.01) |
| H04L 12/58 | (2006.01) |

(52) U.S. Cl.
CPC .... *G06F 16/24578* (2019.01); *G06F 16/9024* (2019.01); *H04L 67/22* (2013.01); *H04L 67/306* (2013.01); *H04L 51/32* (2013.01)

(58) Field of Classification Search
CPC .......... G06F 16/24578; G06F 16/9024; H04L 67/306; H04L 67/22; H04L 51/32
See application file for complete search history.

(56) References Cited

U.S. PATENT DOCUMENTS

| | | | |
|---|---|---|---|
| 9,436,760 B1* | 9/2016 | Tacchi | G06F 16/36 |
| 10,380,129 B2* | 8/2019 | Golland | G06F 16/24578 |
| 2012/0215773 A1* | 8/2012 | Si | G06Q 30/02 |
| | | | 707/723 |

(Continued)

*Primary Examiner* — Greta L Robinson
(74) *Attorney, Agent, or Firm* — Schwegman Lundberg & Woessner, P.A.

(57) ABSTRACT

A system and method for calculating quality score for digital content are provided. In example embodiments, a first graph is generated comprising a user node and an article node, the user node corresponds to a user and the article node corresponds to an article. An edge is generated between the user node and the article node in the first graph based on a first action. A second graph is generated comprising the user node and the article node. An edge is generated between the user node and the article node in the second graph based on a second action type. A first authority score is calculated for the article node within the first graph. A second authority score is calculated for the article node within the second graph. A quality score is calculated for the article.

20 Claims, 7 Drawing Sheets

(56) References Cited

U.S. PATENT DOCUMENTS

2013/0260727 A1* 10/2013 Knudson ............. H04M 1/0264
455/414.1
2014/0317184 A1* 10/2014 Weaver ................. G06Q 10/10
709/204

* cited by examiner

AUTOMATED MEASUREMENT OF CONTENT QUALITY

CROSS-REFERENCE TO RELATED APPLICATIONS

This application is a continuation of prior application Ser. No. 15/481,080, filed on Apr. 6, 2017, which is incorporated by reference herein in its entirety.

TECHNICAL FIELD

Embodiments of the present disclosure relate generally to data processing and, more particularly, but not by way of limitation, to automated measurement of content quality.

BACKGROUND

Whether digital content is worth consuming can be identified by the quality of the content. Quality of digital content help identify the worthiness of consumption by a viewer. The spectrum of digital content quality varies from the low end where content are akin to spam to the high end of the quality spectrum where content are from reputable sources, in one example. The quality of a digital content may be used in determining whether to present in as a search result. Although content quality is distinguished from content relevance, content quality provides an additional signal in the determination of whether the content should be returned as a search result. Relevance is a measure of how well search results match the query. In contrast, content quality can be conceptually thought of as a score for showing how relevant a given content would be for the average query. As a result, measuring the quality of any given content is vital to a search result process.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, systems and methods for determining content quality are described. Within a social networking system, such as LinkedIn®, users interact with written content daily. These interactions are collected, curated, and used to form machine learning models to generate a quality score for the articles based on judgments of users in choosing to interact with one content over other content. Content comes in example form of an article on a webpage, a blog, email, documents, and the like. It is noted that although an article is used as an example herein, the content scoring system may be used to score other types of digital content.

In various embodiments, a content quality system generates multiple interaction graphs that encapsulate interactions between a user and digital content. Each interaction graph comprises of a plurality of user nodes and article nodes, where a user node corresponds to a user of the social networking system and an article node corresponds to an article. An interaction by the user with the article creates an edge between the user node and the article node, where the interaction include sharing the article, commenting on the article, liking the article, dwelling on the article, clicking on the article, or the like. For each interaction type, a separate graph is generated to encapsulate the connections between user and article. Using stochastic approach for linked-structure analysis, hub scores and authority scores are calculated for each user node and article node within the generated graphs. Weights are determined for each node using machine learning models (e.g., logistic regression) to determine the weights given to the nodes of the graphs. A weighted average is calculated for each of the hub scores and authority scores of the graphs, thereby generating a single hub score and authority score vector, such that each user and each article have a single hub score and authority score averaged over the multiple interaction graphs. A hub score reflects the reputation of the user, while the authority score reflects the quality score of the article. Details for each process are described below.

Figure 1:
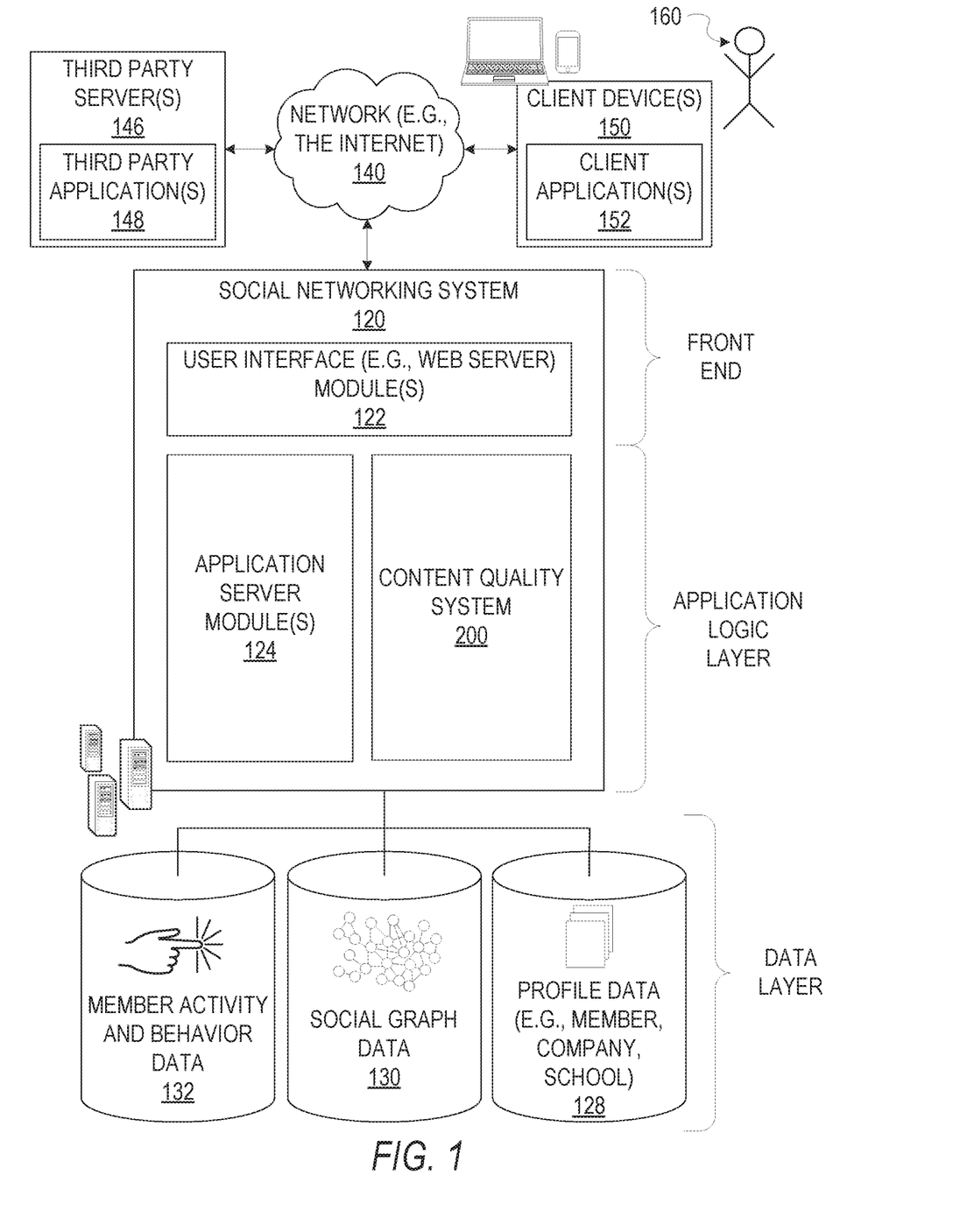
FIG. 1 is a network diagram depicting a client-server system within which various example embodiments may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers. Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a content quality system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
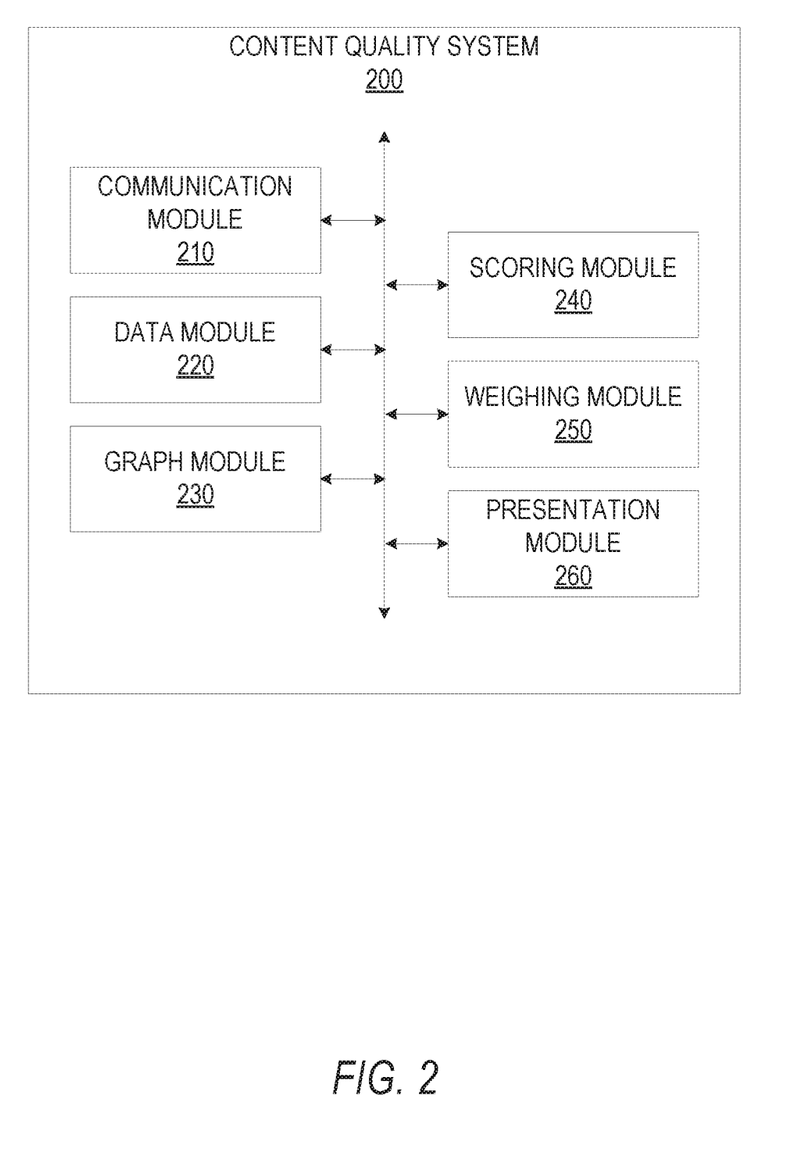
FIG. 2 is a block diagram illustrating an example embodiment of a content quality system, according to some example embodiments.

FIG. 2 is a block diagram illustrating components provided within the content quality system 200, according to some example embodiments. The content quality system 200 automatically identifies the quality score of an article, and thus can be used to promote high quality articles while demoting low quality articles. The content quality system 200 includes a communication module 210, a data module 220, a graph module 230, a scoring module 240, a weighing module 250, and a presentation module 260. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 may also provide various web services functions such as retrieving information from the third party servers 146 and the social networking system 120. In this way, the communication module 210 facilitates the communication between the content quality system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as exchanging information with databases or servers. In various embodiments, the data module 220 stores and accesses data from the member activity and behavior database 132. The member activity and behavior database 132 stores all actions that users make on the website and an indicator of the content associated with the action. The actions include sharing, commenting, liking, dwelling (e.g., the amount of time a user spends on an article), clicking (e.g., a user clicks and reads the article), and the like. Further, the database 132 further stores the article that corresponds to the user action along with the connection between the action and the article by a particular user. The data module 220 further stores and accesses the interaction graph between user and article generated by the graph module 230. The data module 220 further stores and accesses data of pairwise judgment (preference options where users are presented a pair of articles and prompted to make a binary judgment between the pair) and user action at a database for the weighing module 250 to use for determining weights for calculating a quality score of a content.

The graph module 230 is configured to generate an interaction graph encapsulating the relationship between user actions and digital content. The graph module 230 generates a bipartite graph for each types of user interaction, the bipartite graph includes a set of nodes containing two or more nodes. The node categories include user nodes and article nodes. Edges between nodes are based on actions taken by the user on the associated articles. The graph module 230 constructs a node for each member that visits a webpage on the social networking system 120 and a node for each article that the user has taken an action on or otherwise interacted with. An interaction by a user creates an edge between the user node and the article node. Given the set of nodes described, several interaction graphs are constructed. The type of user interaction includes sharing (e.g., the user shares an article on the social network 120), commenting (e.g., the user comments on an article provided in the social network 120), liking (e.g., the user likes an article provided in the social network 120), dwelling (eg., the user hovers or spends some time on an article provided in the social network 120), clicking (e.g., the user clicks and reads the article provided in the social network 120), and the like. In an example, one interaction graph is generated for the sharing action, where an edge is created between the user node and the article node if the user corresponding to the user node shares the article. In another example, another interaction graph is generated for the commenting option, where an edge is created between the user node and the article noted if the user comments on the article. In this way, the graph module 230 constructs several interaction graphs, each having the same user node and article node but with potentially different edges connecting the nodes, depending on the types of interaction. An example of an interaction graph is described in association with FIG. 3.

In other embodiments, the graph module 230 generates a single bipartite graph for all types of user interaction, where any interaction creates an edge between the user nodes and article nodes. The graphs are not separated by the interaction type. Rather, all interactions are embodied within a single bipartite graph. Such a single graph that embodies all interaction leads to less processing and therefore requires less computational requirements and saves resources. Having different graphs for different interaction types as described above allows each type of interaction to be weighted differently in regards to determining the quality score of an article. For instance, a sharing interaction may have more weight in determining the quality score than a dwelling action. Calculating and assigning weights are discussed in further detail below.

In yet other embodiments, the graph module 230 generates a k-partite graph that includes user to article interaction, article to article interaction, and user to user interaction. As described above, edges between nodes within the user to article interaction are generated by a user taking an action (e.g., liking, commenting, sharing, dwelling, etc.) in association with an article. Edges between nodes within the article to article interaction are created where one article includes a hyperlink to another article. Edges between user to user interaction are created where a user interacts with another user, including endorsing a user, commenting an article the user has written, liking an article a user has shared, and the like. An example of a k-partite graph is shown in association with FIG. 4.

In various embodiments, there is an initial filtering process that filters out articles with very low quality, determined by weighing module 250. Where an article's authority score and hub score do not transgress a predetermined threshold, the article is not included in the interaction graph. That is, where the article does not score above a minimal score, the article is considered spam and not used. Such initial filtering eliminates the need to calibrate content quality model at the lower end of the quality spectrum.

In various embodiments, the graphs are restricted to specific types of users. For instance, within quality modeling for an article, it may be prudent to determine that some types of users interact with higher quality articles. In one example, the users within the interaction graphs include only influencer type users within the social network 120. Influencers are users on LinkedIn® who are selected individuals who are invited due to their status within the professional world as thinkers, leaders, and/or innovators of their field.

In other embodiments, the graphs are restricted to specific types of articles being modeled. For instance, the types of articles being modeled to determine quality may be restricted to a domain specific article. In one example, the article used for the interaction graphs can be articles generated within the social network system 102, or third party articles generated from outside the social network system 102. In some instances, articles with a specific domain origin may be given the presumption of high quality and therefore is not modeled to determine a quality score, but rather a high quality score may be presumed. In another example, a specific domain may be articles behind a paywall (e.g., access to a specific website are restricted to users who have paid to subscribe to the site).

The scoring module 240 is configured to provide a quality score for each article. In various embodiments, the scoring module 240 calculates a hub score and an authority score for each node of the interaction graph generated by the graph module 230. Generally, the hub score measures the reputation of particular user, computed based on the authority of articles the users interact with. The authority score measures the quality of the article based on the reputation of the users that interacted with the article. For instance, if more authoritative users interact with a particular article, then the authority of article in increased by such interaction. Likewise, if the user interacts with an article with a high authority score, then the hub score of the user increases. In this way, the scores are self-contained and circular in definition, where the scores are based on user's interactions with articles, such that reputable users are those that interact with quality articles and high quality articles are those that are interacted with by reputable users.

In various embodiments, the hub score and authority score is calculated using a stochastic approach for linked-structure analysis (SALSA). Initially, all users are assigned the same hub score, and all articles are assigned the same authority score. For instance, the initial hub score of the user can be 1/total number of users, while the initial authority score of the article can be 1/total number of articles. A SALSA algorithm is applied to each node, where the authority score is determined by the sum of the hub score of each node that had an associated edge. In this way, a node is given a high authority score by having connected edges to nodes with high hub scores.

For each node, a hub score is determined by the sum of the authority score of each node that has an associated edge. In this way, a node is given a high hub score by having a connected edge to nodes with high authority scores. For each node, an authority score is determined by the sum of the hub score of each node that has an edge to the node. The hub scores and the authority scores are normalized by dividing each hub score by a square root of the sum of the squares of all hub scores and dividing each authority score by a square root of the sum of the squares of all authority scores. Each of the SALSA algorithm is applied to each interaction graph. For instance, there are scores for each node within the sharing interaction graph, commenting interaction graph, liking interaction graph, dwelling interaction graph, clicking interaction graph, and the like. In one example, if a node represents a user Elon Musk, there is a set of scores for the user across all runs of the SALSA algorithm for each of the interaction graph. The set of scores for each interaction graph include ELON-MUSK-CLICK-AUTHORITY-SCORE=0.231 (indicating the authority score for the click action of the interaction graph), ELON-MUSK-CLICK-HUB-SCORE=0.361 (indicating the hub score for the click action of the interaction graph), ELON-MUSK-SHARE-AUTHORITY-SCORE=0.892 (indicating the authority score for the share action of the interaction graph), ELON-MUSK-SHARE-HUB-SCORE=0.472 (indicating the hub score for the share action of the interaction graph), and the like. In this example, there is an interaction graph for the click and share action. However, it is appreciated there are more scores for other actions. The scores are generated in a vector format. Accordingly, there are hub and authority scores for users within the social network system 120 across different interaction graphs. Likewise, there are hub and authority scores for all articles within the interaction graph configuration.

The scoring module 240 combines the scores from the various interaction graph into a single score for each node. For instance, continuing with the user Elon Musk example above, the scoring module 240 generates a single hub score and a single authority score for the node associated with the user Elon Musk across all interaction graph, where each score for each interaction graph is assigned a different weight.

In one example, the single Elon Musk hub score is calculated based on a weighted average of the hub scores for the Elon Musk node within the sharing interaction graph, commenting interaction graph, liking interaction graph, dwelling interaction graph, clicking interaction graph, and the like. For instance, ELON-MUSK-HUB SCORE=w1*ELON-MUSK-COMMENTING-HUB-SCORE+w2*ELON-MUSK-SHARE-HUB-SCORE+w3*ELON-MUSK-LIKING-HUB-SCORE+w4*ELON-MUSK-DWELLING-HUB-SCORE+w5*ELON-MUSK-CLICK-HUB-SCORE, etc, where w is a weighing vector [w1, w2, w3, w4, w5, etc.]. The weighing vector w is determined by the weighing module 250 as further detailed below.

In another example, the single Elon Musk authority score calculated based on a weighted average of the authority scores for the Elon Musk node within the sharing interaction graph, commenting interaction graph, liking interaction graph, dwelling interaction graph, clicking interaction graph, and the like. For instance, ELON-MUSK-AUTHORITY SCORE=v1*ELON-MUSK-COMMENTING-AUTHORITY-SCORE+v2*ELON-MUSK-SHARE-AUTHORITY-SCORE+v3*ELON-MUSK-LIKING-AUTHORITY-SCORE+v4*ELON-MUSK-DWELLING-AUTHORITY-SCORE+v5*ELON-MUSK-CLICK-AUTHORITY-SCORE, etc., where v is a weighing vector [v1, v2, v3, v4, v5, etc.]. The weighing vector v is determined by the weighing module 250 as further detailed below. The authority score of an article node is the quality score of the article.

In various embodiments, quality scores for recent articles are calculated in a different manner. Where the scoring module 240 determines that an article has a number of associated interaction that is below a predetermined threshold, then the quality score of the article is calculated based on the authority score of the low amount of users that have interacted with the article. For certain articles that are relatively recent, it is expected that there have been few interactions, and therefore the traditional SALSA algorithm calculation of a quality score may not reflect the actual quality of the article. For instance, an article has been recently published for two hours, and there has been one user interaction. The quality score of the recent article is calculated based on the authority score of the one user that has interacted with it. In this way, if the user has good authority, it is an indicator that the user has historically interacted with high quality articles, therefore the single user interaction can reflect the quality of the recent article. In another example, if the article is very recent and has zero user interaction, the quality score of the article can be calculated based on the authority score of the web domain of the article, that is the authority score of a particular website. In this way, where a website has traditionally a high authority score (i.e., a website of high reputation which publishes high quality article), it is a good indicator of the quality of the new article.

The weighing module 250 is configured to determine the weights given to each node using machine learning model using training data collected through crowd-sourcing and user action. In various embodiments, pairwise preference judgments through crowd-sourcing are used, where users are presented a pair of articles, and prompted to make a binary judgment between the pair. The pairs are similar in some way and used to control a variable. In one example, the pairs can be chosen between different publishers (website) for the exact same article, which controls for the quality of the publisher (website). In another example, the prompt may ask "who is more authoritative, Elon Musk or Gilbert Gottfried". Given the results of the binary judgment, there is a determination that one node should be scored higher than another. In other embodiments, within a user browse session of the social network system 120, the training data includes which articles the users interacted with within the browse session. For instance, within a browse session started at a feed page, there were ten articles that were presented to the article at the feed page, but the user shared only one article. The one article shared is given a higher weight than the other nine articles due to the user action within a browse session.

In various embodiments, a quality score can be used as one input to determine how relevant a given article would be for the average query. For instance, in response to a search query, where two articles are both relevant to the query (e.g., the articles match similarly well with the input query phrase), the quality score is used to determine that one article is of higher quality. Consequently, the higher quality article would be ranked higher in the search result.

The weighing module 250 uses standard machine learning approaches (e.g. Support Vector Machines, Logistic Regression modeling, Decision Trees, etc.) and use the data collected of these pairwise judgments between vectors and learn a single vector of weights for how to combine the dimensions of these vectors in order to satisfy as many of the pairwise constraints as possible. Accordingly, the weighing module 250 uses machine learning algorithm using a plurality of pairwise preference inputs (gathered through data collection methods discussed above) to determine an output of a set of weights [w1, w2, w3, w4, w5, etc.] and [v1, v2, v3, v4, v5, etc.]. In this way, the data collected is used to learn the weights across different types of interaction to combine different hub and authority scores from different graphs into a single graph score.

In some implementations, the presentation module 260 is configured to present, at a user interface, prompts of pairwise judgments for data collection for the weighing module 250 to calculate a set of weights for each node. For instance, the prompts of pairwise judgments can be "These two articles contain the same content, one is published by Domain X, the other by Domain Y, which article is published with higher quality?" In various implementations, the presentation module 260 presents or causes presentation of information (e.g., visually displaying information on a screen, acoustic output, haptic feedback). Interactively presenting information is intended to include the exchange of information between a particular device and the user of that device. The user of the device may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 250 provides many other user interfaces to facilitate functionality described herein. Further, it will be appreciated that "presenting" as used herein is intended to include communicating information or instructions to a particular device that is operable to perform presentation based on the communicated information or instructions via the communication module 210, data module 220, graph module 230, scoring module 240, and weighing module 250.

Figure 3:
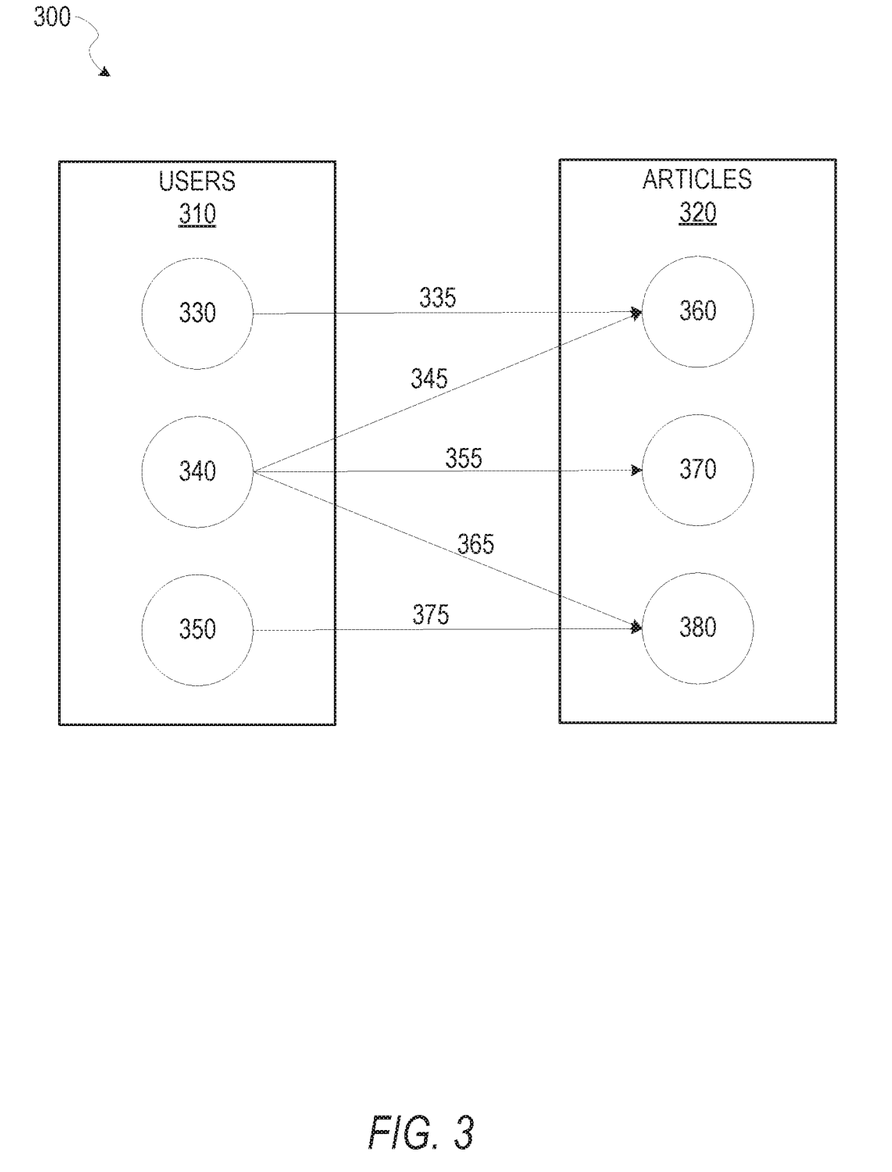
FIG. 3 is a block diagram illustrating an example interaction graph, according to some example embodiments.

FIG. 3 is a block diagram illustrating an example interaction graph, according to example embodiments. A bipartite graph 300 includes a plurality of user nodes 310, a plurality of article nodes 320, and edges. The user nodes 310 includes user node 330, user node 340, and user node 350, each user node corresponds to a member of the social networking system 120. The article nodes 320 includes article node 360, article node 370, article node 380, each article node corresponds to an article. An edge is generated between a user node and an article node in response to a user interaction with the article. A bipartite graph represents one type of interaction. For instance, edge 335 is generated from user node 330 sharing the article corresponding to article node 360, edge 345 is generated from user node 340 sharing the article corresponding to article node 360, edge 355 is generated from user node 340 sharing the article corresponding to article node 370, edge 365 is generated from user node 340 sharing the article corresponding to article node 380, and edge 375 is generated from user node 350 sharing the article corresponding to article node 380. The bipartite graph 300 represents the sharing interaction type. Another bipartite graph is generated to show the edge connections between other interaction types, the interaction types include, sharing, commenting, clicking, dwelling, liking, and the like. A quality score can be generated for each article within the interaction graph 300 as fully described in detail is associated with FIG. 2.

Figure 4:
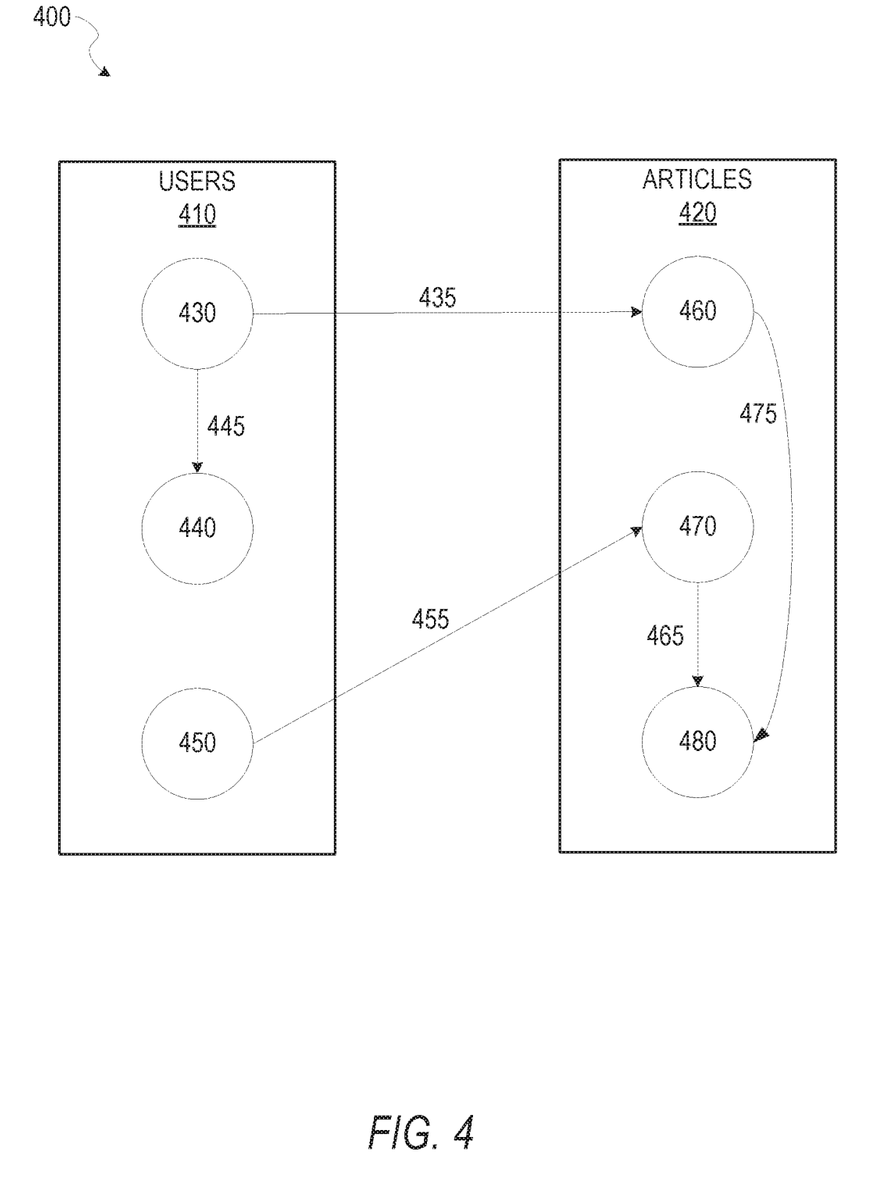
FIG. 4 is a block diagram illustrating an example interaction graph, according to some example embodiments.

FIG. 4 is a block diagram illustrating an example interaction graph, according to example embodiments. A k-partite graph 400 includes a plurality of user nodes 410, a plurality of article nodes 420, and edges. The user nodes 410 includes user node 430, user node 440, and user node 450, each user node corresponds to a member of the social networking system 120. The article nodes 420 includes article node 460, article node 470, article node 480, each article node corresponds to an article. The k-partite graph 400 graph represents all types of interactions which can create edges between nodes. For instance, edge 435 is generated from user node 430 liking an article corresponding to article node 460. The edge 455 is generated from user node 450 clicking an article corresponding to article node 470. Edge 445 is generated from user node 430 interacting with user node 440 within the social networking system 120. For instance, interacting with a user includes endorsing a user, commenting an article the user has written, liking an article a user has shared, and the like. Edge 475 is generated from an article to article interaction, such as article 460 includes a link to article 480. Edge 465 is generated from an article to article interaction, such as article 470 includes a link to article 480. A quality score can be generated for each article within the interaction graph 400 as fully described in detail is associated with FIG. 2.

Figure 5:
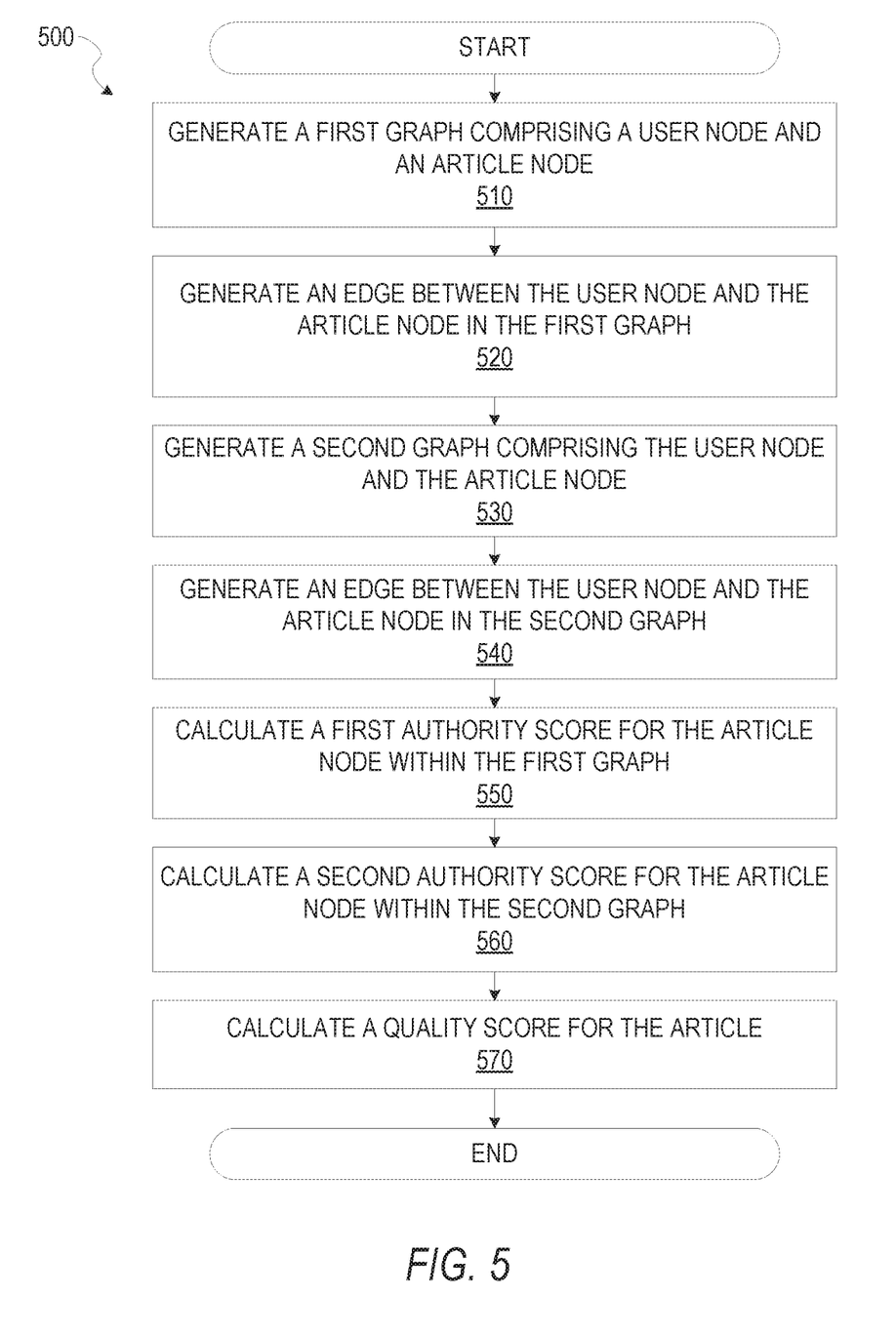
FIG. 5 is flow diagram illustrating an example method for determining content quality, according to some example embodiments.

FIG. 5 is flow diagram illustrating an example method 500 for determining content quality. The operations of the method 500 may be performed by components of the content quality system 200.

At operation 510, the graph module 230 generates a first graph comprising a user node and an article node, the user node corresponds to a user and the article node corresponds to an article. In one example, the first graph may take the form of a graph similar to the bipartite graph 300 as depicted in FIG. 3. In some embodiments, the first graph may be in example format of the sharing interaction graph, commenting interaction graph, liking interaction graph, clicking interaction graph, or dwelling interaction graph as fully descripted in associated with FIG. 3 and FIG. 4. The user node is a node within the user nodes 310. An article node is a node within the article nodes 320.

At operation 520, the graph module 230 generates an edge between the user node and the article node in the first graph based on a first action type by the user in association with the article. In response to a user interacting with an article, an edge is then created between the user node and the article node. In one example, as depicted in FIG. 3, edge 355 is generated between user node 330 and article node 360 in response to the user corresponding to user node 330 sharing an article corresponding to article node 360, the first action type being the act of sharing an article via social network system 120.

At operation 530, the graph module 230 generates a second graph comprising the user node and the article node. For example, the second graph may take the form of a graph similar to the bipartite graph 400 as depicted in FIG. 4. In some embodiments, the first graph may be in example format of the sharing interaction graph, commenting interaction graph, liking interaction graph, clicking interaction graph, or dwelling interaction graph as fully descripted in associated with FIG. 3 and FIG. 4. In this specific example, user node 430 and user node 330 correspond to the same user. Likewise, article node 460 and article node 360 correspond to the same article.

At operation 540, the graph module 230 generates an edge between the user node and the article node in the second graph based on a second action type by the user in association with the article. Unlike the edges of the first graph, the action type that generates an edge between nodes for the bipartite graph 400 is different from the first action type that generated the edge 355 in graph 300. In this particular instance, the first action type is a sharing action and the second action type is a clicking action. For instance, edge 435 is generated between user node 430 and article node 460 in response to the user corresponding to user node 430 sharing an article corresponding to article node 460, the second action type being the act of clicking on a hyperlink corresponding to the article via social network system 120.

At operation 550, the scoring module 240 generates a first authority score for the article node within the first graph based on a hub score of the user node in the first graph. In various embodiments, the scoring module 240 calculates the first authority score for the article node using a stochastic approach for linked-structure analysis (SALSA). The SALSA algorithm determines an authority score for the article node by calculating the sum of the hub score of each node that had an associated edge with the article node as fully described in association with FIG. 2.

At operation 560, the scoring module 240 generates a second authority score for the article node within the second graph based on a hub score of the user node in the second graph. Similar to operation 550, the scoring module 240 calculates the second authority score for the article node using the SALSA algorithm. The second authority score may be different from the first authority score since the edges connecting to the article node in the first graph is different than the edges connecting to the article node in the second graph as fully described in association with FIG. 2. Each edges are generated by different types of user action.

At operation 570, the scoring module 240 generates a quality score for the article based on a weighted average of the first authority score and the second authority score. The weights assigned to the article nodes are described in detail in association with FIG. 2 and FIG. 6.

Figure 6:
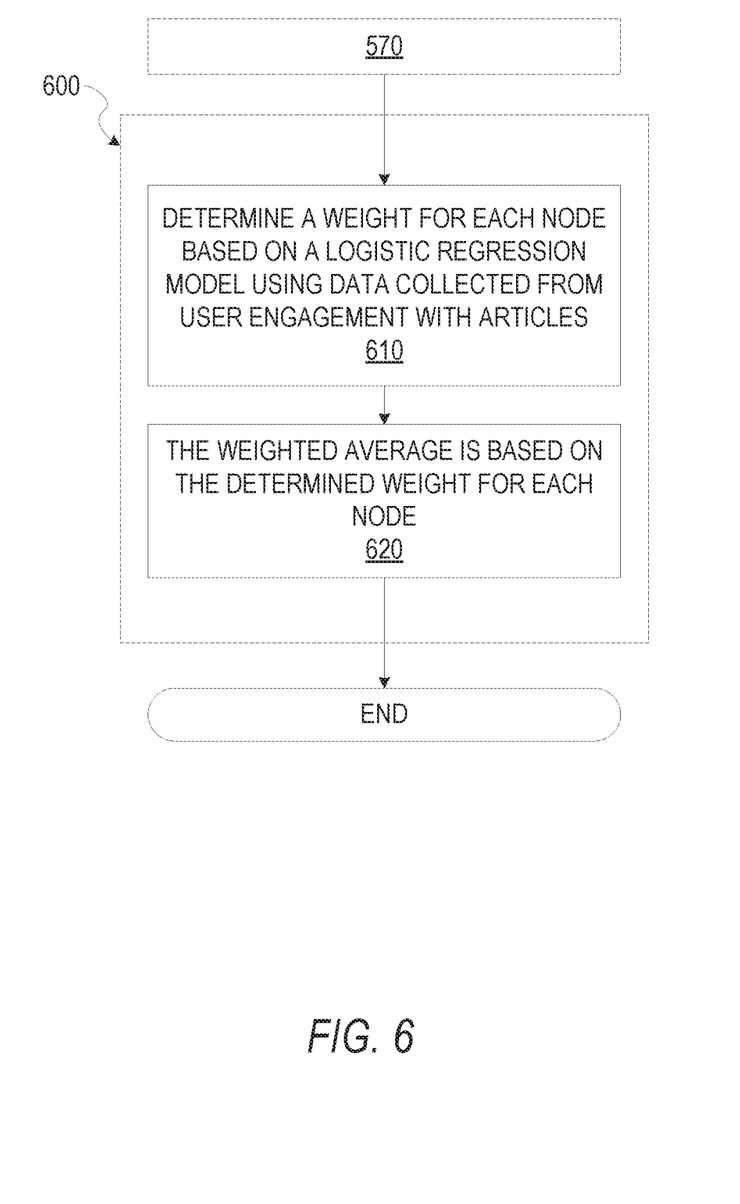
FIG. 6 is flow diagram illustrating an example method for determining weights for content quality, according to some example embodiments.

FIG. 6 is flow diagram illustrating an example method 600 for determining weights assigned to user nodes and article nodes. The operations of the method 600 may be performed by components of the content quality system 200.

At operation 610, the weighing module 250 determines a weight for each node based on a logistic regression model using data collected from user engagement with articles within a browsing session. In other embodiments, the weighing module 250 determines the weights given to each node using other machine learning models (e.g., support vector machines, decision trees, etc.) using training data collected through crowd-sourcing. The data collection using data collected from user engagement with articles can be within a single browse session or multiple browse sessions. The weighting module 250 determines within the brose session which articles the users interacted with and which articles the user did not interact with. A higher weight is given to the article the user interacted with when compared to articles that had no user interaction. The weights assigned to the article nodes are described in detail in association with FIG. 2.

At operation 630, calculating a quality score for the article based on a weighted average of the first authority score and the second authority score, where the weighted average is based on the determined weight for each node. The weights determined by the weighing module 250 is subsequently used to calculate a quality score for the article. The quality score is used to determine that one article is of higher quality compared to another article. Consequently, in a search result, the higher quality article may be ranked higher in the search result in light of its relevance to the search query.

Figure 7:
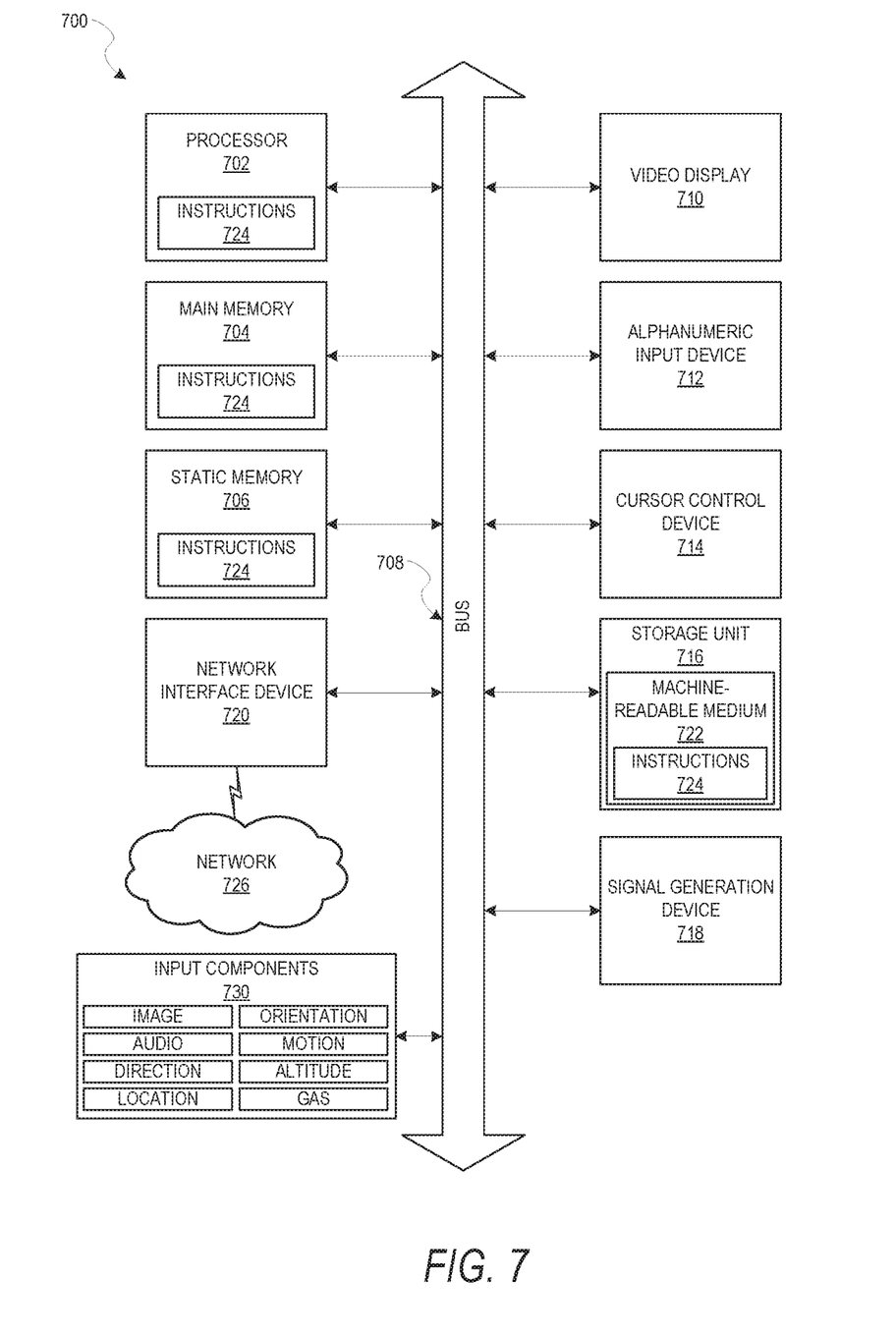
FIG. 7 illustrates a diagrammatic representation of a machine in the form of a computer system within which a set of instructions may be executed for causing the machine to perform any one or more of the methodologies discussed herein, according to an example embodiment

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies, associated with the content quality system 200, discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Any of these machines can execute the operations associated with the content quality system 200. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor, and a memory including instructions, which when executed by the processor, cause the processor to:
generate a first graph comprising a user node and a digital content node, the user node uniquely corresponds to a user and the digital content node uniquely corresponds to digital content;
generate an edge between the user node and the digital content node in the first graph based on a first action type by the user in association with the digital content;
generate a second graph comprising the user node and the digital content node;
generate an edge between the user node and the digital content node in the second graph based on a second action type by the user in association with the digital content;
calculate a first authority score for the digital content node within the first graph based on a hub score of the user node in the first graph;
calculate a second authority score for the digital content node within the second graph based on a hub score of the user node in the second graph; and
calculate a quality score for the digital content based on a weighted average of the first authority score and the second authority score; and
display the digital content in a graphical user interface based on the quality score.

2. The system of claim 1, further comprising:
determine a weight for each authority score based data collected from user engagement with digital content within a browsing session; and
the weighted average is based on the determined weight for each authority score.

3. The system of claim 1, wherein the hub score is a score indicative of a reputation of a corresponding user.

4. The system of claim 3 wherein the hub score for a particular user node is calculated by adding authority scores for digital content nodes having edges connected to the particular user node.

5. The system of claim 1, wherein:
the first graph includes a second digital content node, the second digital content node corresponds to a second digital content; and
generate an edge between the digital content node and the second digital content node based on a hyperlink within the digital content that corresponds to the second digital content.

6. The system of claim 1, wherein:
the calculating the first authority score for the digital content node within the first graph and the second authority score within the second graph is based on a stochastic approach for linked-structure analysis.

7. The system of claim 1, wherein:
the first action type is an action selected from a group consisting of sharing, commenting, liking, dwelling, or clicking on the digital content.

8. The system of claim 1, wherein:
the first graph comprises a plurality of digital content nodes;
determine that a digital content node within the plurality of digital content nodes has no connecting edges; and
calculate a quality score for the digital content node within the plurality of digital content nodes based on an authority score corresponding to the web domain associated with the digital content node.

9. A method comprising:
using one or more computer processors:
generating a first graph comprising a user node and a digital content node, the user node uniquely corresponds to a user and the digital content node uniquely corresponds to digital content
generating an edge between the user node and the digital content node in the first graph based on a first action type by the user in association with the digital content;
generating a second graph comprising the user node and the digital content node;
generating an edge between the user node and the digital content node in the second graph based on a second action type by the user in association with the digital content;
calculating a first authority score for the digital content node within the first graph based on a hub score of the user node in the first graph;
calculating a second authority score for the digital content node within the second graph based on a hub score of the user node in the second graph; and
calculating a quality score for the digital content based on a weighted average of the first authority score and the second authority score; and
displaying the digital content in a graphical user interface based on the quality score.

10. The method of claim 9, wherein the hub score is a score indicative of a reputation of a corresponding user.

11. The method of claim 9, wherein the hub score is a score indicative of a reputation of a corresponding user.

12. The method of claim 9, wherein the hub score for a particular user node is calculated by adding authority scores for digital content nodes having edges connected to the particular user node.

13. The method of claim 9, wherein:
the first graph includes a second digital content node, the second digital content node corresponds to a second text snippet; and
generating an edge between the digital content node and the second digital content node based on a hyperlink within the digital content that corresponds to the second digital content.

14. The method of claim 9, wherein:
the calculating the first authority score for the digital content node within the first graph and the second authority score within the second graph is based on a stochastic approach for linked-structure analysis.

15. The method of claim 9, wherein:
the first action type is an action selected from a group consisting of sharing, commenting, liking, dwelling, or clicking on the digital content.

16. The method of claim 9, wherein
the first graph comprises a plurality of digital content nodes;
determine that a digital content node within the plurality of digital content nodes has no connecting edges; and
calculating a quality score for the digital content node within the plurality of digital content nodes based on an authority score corresponding to the web domain associated with the digital content node.

17. An apparatus comprising
means for generating a first graph comprising a user node and a digital content node, the user node uniquely corresponds to a user and the digital content node uniquely corresponds to digital content;
means for generating an edge between the user node and the digital content node in the first graph based on a first action type by the user in association with the digital content
means for generating a second graph comprising the user node and the digital content node;
means for generating an edge between the user node and the digital content node in the second graph based on a second action type by the user in association with the digital content;
means for calculating a first authority score for the digital content node within the first graph based on a hub score of the user node in the first graph;
means for calculating a second authority score for the digital content node within the second graph based on a hub score of the user node in the second graph; and
means for calculating a quality score for the digital content based on a weighted average of the first authority score and the second authority score; and
means for displaying the digital content in a graphical user interface based on the quality score.

18. The apparatus of claim 17, further comprising the operations further comprise:
means for determining a weight for each authority score based data collected from user engagement with digital content within a browsing session; and
the weighted average is based on the determined weight for each authority score.

19. The apparatus of claim 17, wherein the hub score is a score indicative of a reputation of a corresponding user.

20. The apparatus of claim 17, wherein the hub score for a particular user node is calculated by adding authority scores for digital content nodes having edges connected to the particular user node.

* * * * *